(12) United States Patent
Quix et al.

(10) Patent No.: US 11,603,579 B2
(45) Date of Patent: Mar. 14, 2023

(54) LITHIUM-RICH METALLURGICAL SLAG

(71) Applicant: Umicore, Brussels (BE)

(72) Inventors: Maarten Quix, Hoboken (BE); David Van Horebeek, Tielt-Winge (BE); Thomas Suetens, Westerlo (BE)

(73) Assignee: UMICORE, Brussels (BE)

( * ) Notice: Subject to any disclaimer, the term of this patent is extended or adjusted under 35 U.S.C. 154(b) by 0 days.

(21) Appl. No.: 16/069,333

(22) PCT Filed: Jan. 4, 2017

(86) PCT No.: PCT/EP2017/050097
§ 371 (c)(1),
(2) Date: Jul. 11, 2018

(87) PCT Pub. No.: WO2017/121663
PCT Pub. Date: Jul. 20, 2017

(65) Prior Publication Data
US 2019/0032171 A1    Jan. 31, 2019

(30) Foreign Application Priority Data

Jan. 12, 2016   (EP) .................................. EP16150857

(51) Int. Cl.
| | | |
|---|---|---|
| C22B 26/12 | (2006.01) | |
| C22B 7/04 | (2006.01) | |
| C03C 3/062 | (2006.01) | |
| C03C 3/087 | (2006.01) | |
| C22B 7/00 | (2006.01) | |

(52) U.S. Cl.
CPC ............. *C22B 26/12* (2013.01); *C03C 3/062* (2013.01); *C03C 3/087* (2013.01); *C22B 7/003* (2013.01); *C22B 7/04* (2013.01); *Y02P 10/20* (2015.11)

(58) Field of Classification Search
CPC ........... C22B 26/12; C22B 7/003; C22B 7/04; C03C 3/062; C03C 3/087; Y02W 30/84
USPC .......................................................... 75/329
See application file for complete search history.

(56) References Cited

U.S. PATENT DOCUMENTS

2012/0240729 A1* 9/2012 Verscheure ............. C22B 7/003
75/626
2017/0129005 A1* 5/2017 Balichev ................ B22D 11/111

FOREIGN PATENT DOCUMENTS

| CN | 101125357 A | 2/2008 |
| CN | 101555030 A | 10/2009 |
| JP | 2010-125509 A | 6/2010 |

(Continued)

OTHER PUBLICATIONS

Translation of WO '470 claims, Espace.net (Year: 2019).*

(Continued)

*Primary Examiner* — Brian D Walck
*Assistant Examiner* — Danielle Carda
(74) *Attorney, Agent, or Firm* — NK Patent Law

(57) ABSTRACT

The present invention concerns a slag composition having a high lithium content, suitable as additive in the manufacture of end-user products, or for the economic recovery of the contained lithium.

The lithium concentration indeed compares favorably with that of spodumene, the classic mineral mined for lithium production. This slag is characterized by a composition according to: $3\% < Li_2O < 20\%$; $1\% < MnO < 7\%$; $38\% < Al_2O_3 < 65\%$; $CaO < 55\%$; and, $SiO_2 < 45\%$.

11 Claims, 1 Drawing Sheet

(56) References Cited

FOREIGN PATENT DOCUMENTS

| JP | 2013091826 A | 5/2013 | | |
|---|---|---|---|---|
| WO | 2011141297 A1 | 11/2011 | | |
| WO | WO-2015197470 A1 | * | 12/2015 | ............ B22D 11/111 |

OTHER PUBLICATIONS

Verhaeghe et al., "Valorisation of battery recycling slags" (2011), Proceedings of the Second International Slag Valorisation Symposium, p. 365-373 (Year: 2011).*

Elwert et al., "Phase Composition of High Lithium Slags from the Recycling of Lithium Ion Batteries", World of Metallurgy—ERZMETALL 65 No. 3, p. 163-171 (Year: 2012).*

Dunn et al., "Material and energy flows in the materials production, assembly, and end-of-life stages of the automotive lithium-ion battery life cycle", Argonne National Lab, doi:10.2172/1044525. (Year: 2012).*

Haccuria et al., "Phase equilibria studies of the 'MnO'—Al2O3—SiO2 system in equilibrium with metallic alloy. Part 1: Development of the technique and determination of liquidus isotherms between 1423 K and 1523 K", Int. J. Mater. Res. 105 (2014) 10, p. 941-952, DOI: 10.3139/146.111110 (Year: 2014).*

Haccuria et al., "Phase equilibria studies of the 'MnO'—Al2O3—SiO2 system in equilibrium with metallic alloy. Part 2: phase equilibria", Int. J. Mater. Res. 106 (2015) 3; p. 225-236, DOI:10.3139/146.111181 (Year: 2015).*

Guoxing et al. in "Recovery of Valuable Metals from Spent Lithium-Ion Batteries by Smelting Reduction Process Based on MnO—Al2O3—SiO2 Slag System", Advances in Molten Slags, Fluxes, and Salts: Proceedings of The 10th International Conference on Molten Slags, Fluxes and Salts (MOLTEN16) (Year: 2016).*

Elwert, T., et al., Phase composition of high lithium slags from the recycling of lithium ion batteries, World of Metalllurgy-Erzmetall, GDMB-Medienverlag, Clausthal-Zellerfeld, DE, May 1, 2012, pp. 163-171, vol. 65, No. 3, XP009185147, ISSN: 1613-2394.

PCT, International Search Report and Written Opinion in International Application No. PCT/EP2017/050097 dated Feb. 22, 2017.

CNIPA; Office Action for Chinese Patent Application No. 201780005822.0 dated Oct. 9, 2019, 6 pages.

"Ternary Phase Diagrams of Al2O3—CaO—SiO2", Slag Atras, Fig. 58, 1981, 1 page.

JPO; Office Action for Japanese Patent Application No. 2018-535127 dated May 13, 2021, 6 pages.

KIPO; Translation of Office Action for Korean Patent Application No. 10-2018-7019824 dated Nov. 29, 2021, 7 pages.

* cited by examiner

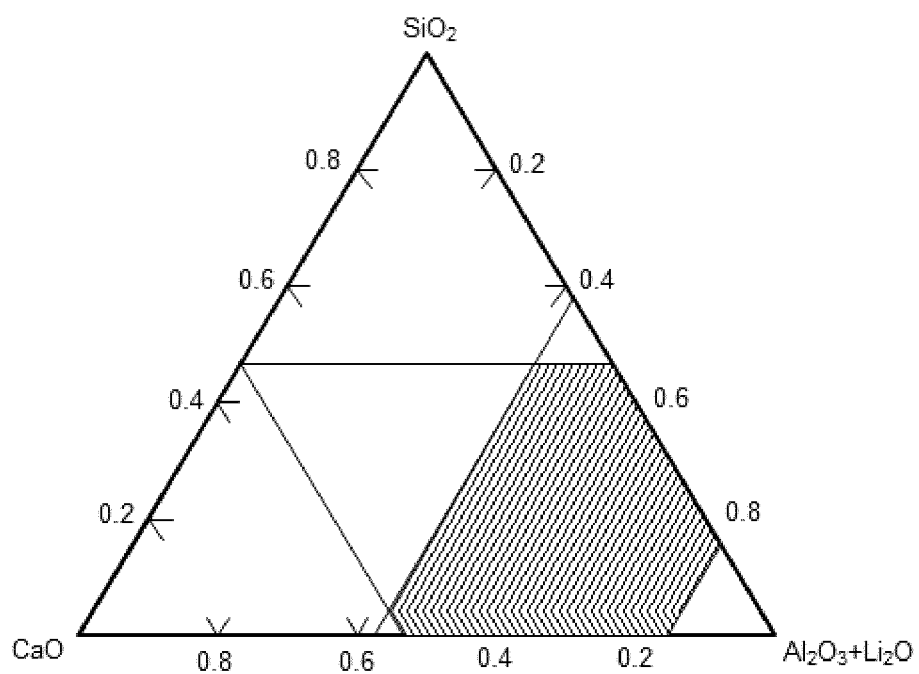

LITHIUM-RICH METALLURGICAL SLAG

This application is a U.S. National Stage application of International Application No. PCT/EP2017/050097, filed on 4 Jan. 2017, which claims the benefit of European Patent Application No. 16150857.7, filed 12 Jan. 2016, the entire contents of which are all hereby incorporated herein by reference.

The present invention concerns a slag composition having a high lithium content, suitable as additive in the manufacture of end-user products, or for the economic recovery of the contained lithium.

Lithium is normally sourced from ore deposits or from salt brines. For the reasons detailed below, lithium valuation and recovery from secondary materials has however become an important economic and environmental issue.

The lithium content (expressed as $Li_2O$) of commercial ore deposits is typically below 3% (all % expressed by weight). The ore can be concentrated to 4 to 8% using common mining techniques such as milling, classification and flotation. The mineral concentrates can be used directly in end products or for the preparation of pure compounds such as lithium carbonates or hydroxides. Lithium extracted from salt brines is mainly used for the production of pure lithium compounds.

Lithium is found in more than 100 different minerals, but it is in practice extracted only from spodumene ($Li_2O.Al_2O_3.4SiO_2$), lepidolite ($KLi_2Al\ (Al,Si)_3O_{10}(F,OH)_2$), petalite ($LiAlSi_4O_{10}$), amblygonite $(Li,Na)AlPO_4(F,OH)$, and eucryptite ($LiAlSiO_4$).

For some applications, both mineral concentrates and pure compounds are needed, such as in glass, ceramics, and glass-ceramic manufacturing. For other applications like greases, aluminum smelting, and rechargeable batteries, only pure compounds are needed. Lithium, furthermore, goes in its metallic form in lithium primary batteries, and in specific pharmaceuticals and catalysts.

The demand for pure lithium compounds in rechargeable batteries is expected to exceed that of all other applications in the near future. Recycling lithium-bearing batteries is consequently a major topic, the economic driving force being further boosted if the cobalt and nickel contained in such batteries can be valuated alongside with the lithium. Pyrometallurgy processes lend themselves well to reach this combined objective.

In a known pyrometallurgy process using a molten bath furnace for the recycling of e.g. lithium-bearing batteries, the addition of fluxing compounds leads to the formation of a slag wherein the more easily oxidized elements such as aluminum, silicon and lithium are collected; the less easily oxidized elements such as copper, nickel, and cobalt are collected in a separate alloy phase.

When processing lithium batteries in a molten bath furnace, $Al_2O_3$ is an important yet unavoidable slag component: metallic aluminum is indeed typically present in the electrodes or casing and will oxidize despite the strong reducing conditions maintained to form the alloy. Classically, CaO and $SiO_2$ are added as fluxing compounds to bring the melting point of the slag down to a reasonable working temperature. The obtained slag is of low economic value because of the dilution of the lithium by the fluxing agents. It may moreover contain significant amounts of heavy metals, precluding its re-use in some applications.

It has now been found that high concentration of $Li_2O$ combined with MnO can reduce the viscosity of a slag containing high amounts of $Al_2O_3$. As a result, less CaO and $SiO_2$ is needed as fluxing agents, thus avoiding the lithium dilution effect. Yet, by respecting specific bounds of compositions, practical working conditions of melting point and viscosity are reached below 1700° C., or even below 1600° C. The latter temperature limit is advantageous in view of the lower energy demands and of the increased longevity of the furnace lining.

More specifically, a suitable $Li_2O$ bearing metallurgical slag should comprise:
  3%<$Li_2O$<20%;
  1%<MnO<7%;
  38%<$Al_2O_3$<65%;
  CaO<55%; and,
  $SiO_2$<45%.

FIG. 1 illustrates the above-defined domain as a hatched area on a CaO—SiO2-(83% $Al_2O_3$+17% $Li_2O$) phase diagram. It should be noted that this representation is approximate and indicative only: it is only valid for a fixed albeit typical $Al_2O_3$ to $Li_2O$ ratio of 83 to 17, and it does not account for other compounds such as MnO or FeO.

The lower limit on the $Li_2O$ of 3%, together with the upper limits on fluxing agents CaO and $SiO_2$ of respectively 55% and 45%, define a domain where the valorization of lithium remains economical, without facing too high a penalty due to dilution.

The upper limit on the $Al_2O_3$ content, together with the lower bound on the sum of CaO and $SiO_2$ ensure that the slag melting point remains below 1700° C. By limiting $Al_2O_3$ to 55%, a further decrease of temperature is possible, down to 1600° C. or less.

The slag will consist essentially of $Al_2O_3$, $SiO_2$, CaO, $Li_2O$, and MnO, these 5 compounds forming at least 73% of the total composition. Other typical compounds that may be present are FeO and MgO. In a preferred embodiment, the above-mentioned essential compounds should represent more than 80% of the total slag composition.

The $Li_2O$ concentration is preferably higher than 5%, more preferably higher than 10%. This ensures a better recovery yield of the lithium as e.g. carbonate or hydroxide when processing the slag to obtain pure lithium compounds. Suitable processes for this could be any one of the known acid or alkaline leaching processes similar to those used for lithium recovery from spodumene.

The upper limit for $Li_2O$ in the slag is a practical one, as its viscosity becomes impractical when a concentration of more than 20% is reached.

The upper limit on $SiO_2$, when combined with a minimum amount of MnO, helps in keeping the viscosity of the slag sufficiently low, even at temperatures close to the melting point. A low viscosity is important to allow for the fast and complete settling of the metallic alloy phase. A deficient decantation would indeed result in alloy droplets remaining dispersed in the slag. This would jeopardize the cobalt yields.

MnO is also beneficial as an additive in the manufacture of glass, ceramics and glass-ceramics. MnO is indeed often added to obtain a brown to purple color. MnO is also used in mold powders, which provide lubrication and control the heat transfer in e.g. steel slab casting.

A proper level of reduction is needed during smelting to collect the cobalt and nickel in an alloy phase. A lesser level of reduction would limit the re-use of the slag to those rare application where cobalt oxide is actually welcome, such as for the manufacture of blue glass. More generic reuse could however be precluded.

Indeed, the current European REACH regulation addresses the production and use of chemical substances and their potential impact on human health (cf. Annex VI of the CLP Regulation (EC) No 1272/2008). Cobalt oxide, as well as cobalt metal, is hereby taken into account for the determination of the substances' classification. Both cobalt-bearing species contribute significantly, but other typical slag impurities also have to be accounted for. In view of a favorable classification, a total cobalt content in the slag of less than 1% is preferred, less than 0.5% being more preferred.

According to a preferred embodiment, a $SiO_2$ concentration lower than 25%, or more preferably lower than 15% is chosen. The specific benefits of reducing the $SiO_2$, thus selecting working conditions in the lower-left part of the shaded area in FIG. 1 are:
- $SiO_2$ tends to increase the viscosity of the slag, which is undesired;
- $SiO_2$ interferes with some of the lithium refining steps.

According to a preferred embodiment, a CaO concentration lower than 25%, or more preferably lower than 15% is chosen. The specific benefits of selecting working conditions in the upper-right part of the hatched area in FIG. 1 are:
- A more concentrated lithium slag is obtained, as the lithium is not diluted by CaO; more $Li_2O$ means that even less CaO is needed to guarantee a low viscosity, as it is assumed that $Li_2O$ may substitute CaO with respect to this effect;
- Because calcium is usually added as limestone, which contains carbonates, an appreciable amount of energy is required for its conversion to CaO, thereby releasing $CO_2$, which is undesired;
- Slag depleted in CaO can be used in applications where calcium is not well tolerated, such as in glass-ceramics manufacturing;
- A low CaO content is also desirable when the slag is processed for the recovery of lithium as pure compounds. Calcium indeed interferes with some of the purification steps.

In another embodiment of the invention, a pyrometallurgy process for smelting lithium-bearing batteries, their components or their scraps is defined, thereby producing a metal-bearing alloy, and a $Li_2O$ bearing metallurgical slag according to the above-mentioned characteristics.

The different embodiments are illustrated with the following example.

Use is made of an apparatus comprising a bath smelter equipped with a lance for blowing gasses directly into the slag layer residing on top of the molten metal alloy. A so-called starting bath of molten slag is provided, such as from a previous operation performed in similar conditions.

Spent rechargeable lithium-ion batteries are fed to the furnace at a rate of 100 kg/h while limestone ($CaCO_3$) and sand ($SiO_2$) are simultaneously added at rates of 10 kg/h and 5.5 kg/h respectively. About 38 $Nm^3$ $O_2$ per ton batteries is supplied through the lance to provide heat to the furnace. This amount is chosen so as to guarantee strongly reducing conditions, i.e. leading to the formation of an alloy collecting copper, nickel, iron, and cobalt, each with yields of preferably more than 95% versus total elemental input.

In this particular case, the process appears to be autogenous, as no additional fuel is needed. This is due to the relatively high amounts of reducing agents such as metallic aluminum (about 6%) and carbon (about 20 to 25%) in the spent batteries treated. A bath temperature between 1400° C. and 1700° C. is achieved, which is suitable to maintain both the slag and the alloy sufficiently fluid for easy tapping and handling. The produced alloy and slag are then tapped, either periodically or continuously.

Table 1 shows the amounts and analyses of the input and output phases of the process, on an hourly basis. The figures between parentheses correspond to the elemental concentrations expressed as weight % of the main oxidized species assumed to prevail in the slag. Significantly more than 50% of the lithium reports to the slag, while a minor fraction escapes with the fumes. The slag is fluid and is free of metallic droplets.

Table 2 illustrates other slag compositions that are obtained using a similar process. These slags correspond to the above-mentioned suitable $Li_2O$ bearing metallurgical slag, and/or according to said first or second preferred embodiments.

TABLE 1

Input and output phases of the process on an hourly basis

| | Mass (kg) | Composition (%) | | | | | | | | |
|---|---|---|---|---|---|---|---|---|---|---|
| | | Cu | Ni | Fe | Co | Mn (MnO) | Al ($Al_2O_3$) | Si ($SiO_2$) | Li ($Li_2O$) | $CaCO_3$ (CaO) |
| Input | | | | | | | | | | |
| Batteries | 100 | 10 | 4.0 | 14 | 10 | 2.0 | 6.0 | | 1.5 | |
| Sand | 5.5 | | | | | | | (100) | | |
| Limestone | 10 | | | | | | | | | 100 |
| Output | | | | | | | | | | |
| Alloy | 40 | 25 | 10 | 35 | 25 | 4.0 | | | | |
| Slag 1 | 26 | 0.08 | 0.05 | 0.17 | 0.1 | (2.1) | (44.4) | (21.8) | (8.4) | (22) |

TABLE 2

Composition of other slags produced

| | Composition (%) | | | | | | | | |
|---|---|---|---|---|---|---|---|---|---|
| | Cu | Ni | Fe | Co | MnO | $Al_2O_3$ | $SiO_2$ | $Li_2O$ | CaO |
| Slag 2 | 0.60 | 0.20 | 1.60 | 0.90 | 2.6 | 44.2 | 30.0 | 9.0 | 11.4 |
| Slag 3 | 0.10 | 0.06 | 0.40 | 0.25 | 1.3 | 48.0 | 36.4 | 11.6 | 2.5 |

TABLE 2-continued

Composition of other slags produced

| | Composition (%) | | | | | | | | |
|---|---|---|---|---|---|---|---|---|---|
| | Cu | Ni | Fe | Co | MnO | $Al_2O_3$ | $SiO_2$ | $Li_2O$ | CaO |
| Slag 4 | 0.30 | 0.10 | 1.00 | 0.20 | 3.9 | 39.1 | 25.7 | 8.1 | 8.0 |
| Slag 5 | 0.18 | 0.07 | 0.46 | 0.35 | 2.5 | 47.6 | 21.1 | 9.0 | 16.6 |
| Slag 6 | 0.09 | 0.02 | 0.36 | 0.21 | 1.2 | 48.4 | 18.9 | 9.8 | 22.8 |

The described metallurgical slags are suitable as such with respect to the smelting process itself: they allow for the desired separation between more easily oxidized metals such as lithium, and less easily oxidized metals such as cobalt and nickel. The $Li_2O$ content of the slag may reach concentrations well above those found in minerals, making the slag an economical source for lithium recovery. The process also allows for the recovery of other valuable metals, in particular cobalt and nickel, which are concentrated in metallic form in the alloy.

The invention claimed is:

1. A $Li_2O$ bearing metallurgical slag comprising $Al_2O_3$, $SiO_2$, CaO, and MnO, wherein the by-weight composition is as follows:
   8%≤$Li_2O$≤11.6%;
   1.2%≤MnO≤6.7%;
   39%≤$Al_2O_3$<55%;
   2.5%≤CaO<25%; and
   15%≤$SiO_2$≤36.4%,
   wherein a total cobalt content in the $Li_2O$ bearing slag is 0.1%≤Co≤0.9%.

2. The $Li_2O$ bearing metallurgical slag of claim 1, wherein the $SiO_2$ concentration is greater than or equal to 15% and lower than 25%.

3. The $Li_2O$ bearing metallurgical slag of claim 1, wherein the sum of the $Al_2O_3$, $SiO_2$, CaO, MnO, and $Li_2O$ concentrations is higher than 80%.

4. The $Li_2O$ bearing metallurgical slag of claim 1, wherein the by-weight composition meets the following ranges:
   8.2%≤$Li_2O$≤11.6%, 39%<$Al_2O_3$<48.4%, 2.5%≤CaO<22.8%; and 18.9%≤$SiO_2$<36.4%.

5. The $Li_2O$ bearing metallurgical slag of claim 1, wherein the by-weight composition is as follows:
   8.1%≤$Li_2O$≤11.6%;
   1.2%≤MnO≤6.7%;
   39%≤$Al_2O_3$<48.4%;
   19.3%≤CaO<22.8%; and
   21%≤$SiO_2$≤36.4%,
   wherein a total cobalt content in the $Li_2O$ bearing slag is 0.1%≤Co≤0.9%.

6. A smelting process for recovering $Li_2O$ from spent lithium-bearing batteries, wherein the recovered $Li_2O$ is present in slag produced by the smelting process in an amount of at least 8 wt % of the metallurgical slag composition, the process comprising
   feeding spent lithium-bearing batteries, their components or their scraps to a smelter, the smelter containing a molten bath comprising a slag layer residing on top of a metal alloy layer; and
   introducing oxygen to the molten bath in an amount selected to influence the composition of the metal alloy and the slag, wherein the yield of Co in the metal alloy is at least 95% versus total elemental input to the smelter, the content of Co in the slag is less than 1 wt % of the total slag composition, and the contents of MnO, $Al_2O_3$, CaO, and $SiO_2$ in the slag are as follows:
   1.2%≤MnO≤6.7%;
   39%≤$Al_2O_3$<55%;
   2.5%≤CaO<25%; and
   15%≤$SiO_2$≤36.4%.

7. The process of claim 6, wherein the total cobalt content in the $Li_2O$ bearing slag is 0.1%≤Co≤0.5%.

8. The process of claim 6, wherein the aluminum content in the spent batteries is about 6%.

9. The process of claim 6, wherein the carbon content in the spent batteries is about 20% to 25%.

10. The process of claim 6, wherein more than 50% of the lithium reports to the slag.

11. The process of claim 6, wherein about 38 $Nm^3$ $O_2$ per ton of batteries is supplied to the furnace to provide heat to the furnace.

* * * * *